Inventor
KURT VOIHS
JOHANNES SCHNITZLER
THEO BURDELSKI

Jan. 8, 1963   K. VOIHS ET AL   3,071,941
SPINDLE COUPLING
Filed Oct. 11, 1961   3 Sheets-Sheet 2
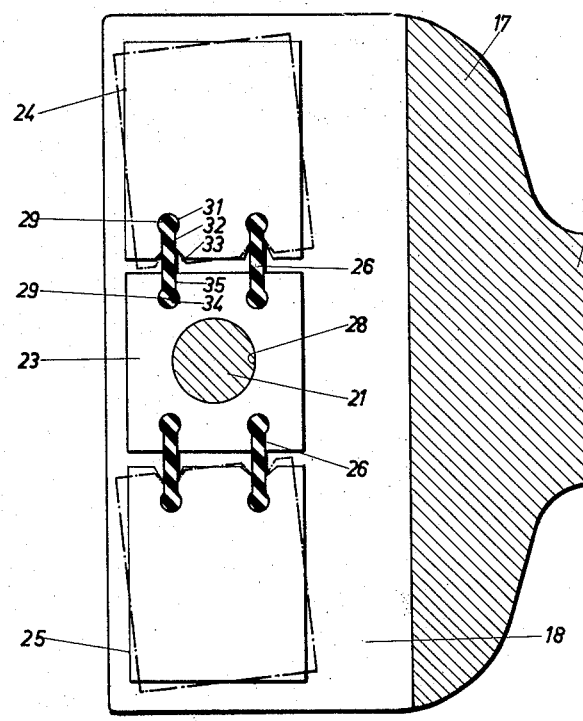
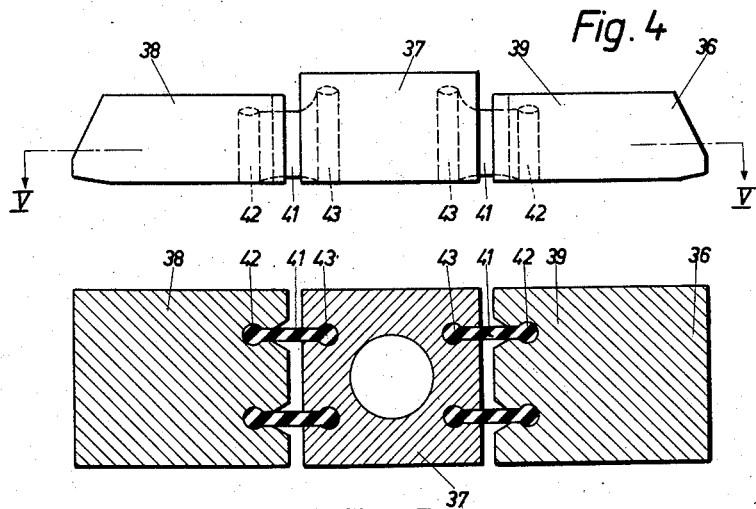
Inventor
KURT VOIHS
JOHANNES SCHNITZLER
THEO BURDELSKI
BY Norman S. Blodgett
ATTORNEY Jan. 8, 1963    K. VOIHS ET AL    3,071,941
SPINDLE COUPLING
Filed Oct. 11, 1961    3 Sheets-Sheet 3

Inventor
KURT VOIHS
JOHANNES SCHNITZLER
THEO BURDELSKI
BY Norman S. Blodgett
ATTORNEY

United States Patent Office 3,071,941
Patented Jan. 8, 1963

3,071,941
SPINDLE COUPLING
Kurt Voihs, Dusseldorf, Johannes Schnitzler, Duisburg, and Theo Burdelski, Dusseldorf, Germany, assignors to Ferroplast, Th. Burdelski & Co., Dusseldorf, Germany, a corporation of Germany
Filed Oct. 11, 1961, Ser. No. 144,457
9 Claims. (Cl. 64—7)

This invention relates to a spindle coupling and more particularly to apparatus arranged to provide a universal connection between elements of a drive system.

In the transmission of power, and particularly in the transmission of power to the rolls of a rolling mill, it is common practice to use a universal coupling of the type shown and described in the patent of Smith No. 2,305,703. In such applications, where the capital cost of the equipment is very great, so that the apparatus must be operated continuously, an interruption of services is a very serious matter. Nevertheless, in such articulated couplings, in the past, slipper blocks have been used which were subject to rapid wear and to eventual breakdown. In a rolling mill, for instance, the pinion gear shafts remain in fixed positions, while the roll necks may be separated by varying distances; this means that, in many instances, the spindles are not aligned with the rolls which they drive. For that reason, a universal coupling is used. The mis-alignment of the spindles with the roll necks causes a to-and-fro movement between the slipper blocks and the other parts of the universal coupling during the rotation of the equipment. The problem of wear of the slipper blocks is particularly acute because, as a general rule, these couplings are open and its difficult to maintain grease on the contact surfaces. These and other difficulties experienced with the prior art devices have been obviated in a novel manner by the present invention.

It is, therefore, an outstanding object of the invention to provide a spindle coupling which is capable of a long life of useful service with a minimum requirement for maintenance and a reduced possibility of sudden interruption of service.

Another object of this invention is the provision of universal coupling making use of slipper blocks wherein the blocks are subject to a minimum amount of wear.

A further object of the present invention is the provision of a slipper block construction for a universal coupling in which the block is constructed so that its outer ends do not take part in the to-and-fro motion normally encountered with such blocks.

It is another object of the instant invention to provide a slipper block for a universal joint in which the end portions of the slipper block are mounted independently of the center portion to minimize movement of these ends relative to an enclosing housing.

It is a further object of the invention to provide a slipper block for a universal joint in which the outer ends of the blocks are mounted for independent movement relative to the center part of the block and resilient interconnecting means assures that wear on the ends of the block is minimized.

With these and other objects in view, as will be apparent to those skilled in the art, the invention resides in the combination of parts set forth in the specification and covered by the claims appended hereto.

The character of the invention, however, may be best understood by reference to certain of its structural forms as illustrated by the accompanying drawings in which:

FIG. 3 is a horizontal sectional view of the coupling taken on the line III—III of FIG. 2;

FIG. 4 is an elevational view of a slipper block used in the coupling;

FIG. 5 is a sectional view of the slipper block taken on the line V—V of FIG. 4;

Figure 1:
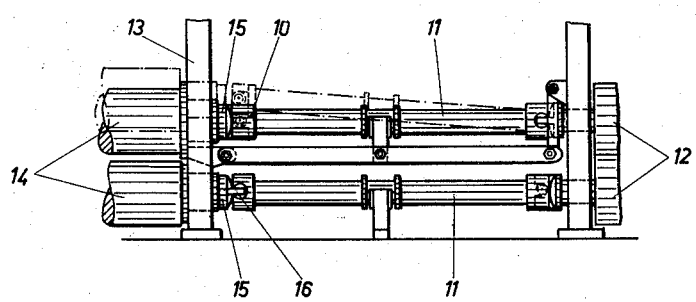
FIG. 1 is an elevational view of a rolling mill apparatus making use of spindle couplings constructed according to the principles of the present invention.

Referring first to FIG. 1, wherein are best shown the general features of the invention, the spindle coupling, designated generally by the reference numeral 10, is shown in use with a spindle 11 joining a set of pinion gears 12 to a rolling mill 13 having vertically-spaced, parallel rolls 14. The spindles 11 are connected at one end to the shafts of the pinion gears 12 and at the other end through the couplings 10 to the roll necks 15 of the rolls 14. Each roll neck is provided with a wobbler or tongue 16 which fits into the coupling 10 in a manner which will be described more specifically hereinafter.

Figure 2:
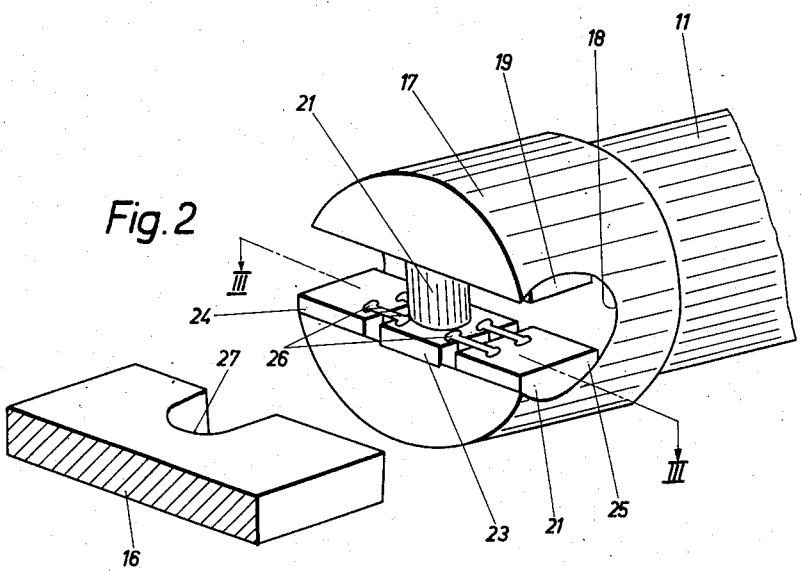
FIG. 2 is a perspective view of the spindle coupling.

Referring to FIG. 2, it can be seen that the end of the spindle 11 is provided with an enlarged head 17 which forms part of the coupling. This head is provided with a slot 18 which has a cylindrical surface extending transversely of the axis of the spindle. Within this slot resides two slipper blocks 19 and 21. Also transversely of the length of the spindle and extending across the slot 18 is a pin 21, this pin being at an exact right angle to the axis of the cylindrical surface defining the slot 18. As is evident in the drawing, the slipper block 21 consists of a central portion 23 and two end portions 24 and 25. The end portions lie on either side of the central portion and are joined to it by elastomer connecting links 26. The free end of the tongue 16 is provided with a slot 27 which fits rather closely around the pin 21 which, in turn, extends into bores in each of the central portions 23 of the slipper blocks.

In FIG. 3 it can be seen that the pin 21 lies in a vertical bore 28 which extends through the central portion 23 of the slipper block. Also evident in FIG. 3 is the fact that each of the connecting links 26 consists of a plate of an elastomer material, such as a polyamide or vulcanized rubber. The width of each plate is considerably greater than its thickness. Each connecting link is provided with a cylindrical enlargement 29 at each end. The end which resides in the end portion 24 of the slipper block resides in a vertical groove through the end portion and is fastened therein by cementing or the like. This vertical groove consists of a cylindrical portion 31, a rectilinear portion 32, and a V-shaped beveled portion 33. The end which is attached to the central portion 23 also resides in a groove in which it resides, but this groove is only provided with a cylindrical portion 34 and a rectilinear portion 35. In this embodiment of the invention all three portions of the block are of equal height and the connecting links 26 extend vertically throughout the entire height of the portions of the blocks to which they are connected.

In FIG. 4 is shown a modification of the invention in which the slipper block, indicated generally by the reference numeral 36, is provided with a central portion 37 and two end portions 38 and 39, wherein the central portion 37 is considerably higher than the end portions 38 and 39. The elastomer connecting links 41 are provided with enlargements 42 which reside within grooves in the end blocks 38 and 39 and enlargements 43 which reside in vertical grooves in the central portion 37. It should be noted, however, that the enlargements 42 (and the ends of the links 41 on which they are formed) are narrow, this being commensurate with the limited height of the end portions 38 and 39, while the enlargements 43 (and the ends of the links on which they are formed) are wide, since the central portion 37 is similarly high.

Figure 6:
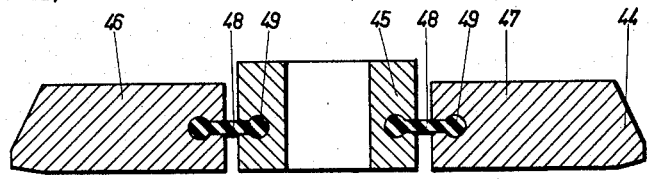
FIG. 6 is a vertical sectional view of a modified form of the invention taken on the line VI—VI of FIG. 7.
Figure 7:
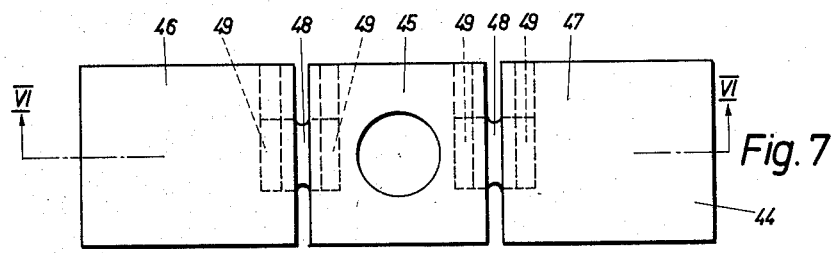
FIG. 7 is a plan view of the slipper block shown in FIG. 6.

In FIGS. 6 and 7, the slipper block 44 is shown as consisting of a central portion 45 and end portions 46 and 47 which are joined to the central portion by means of elastomer connecting links 48. The links are provided at their ends with enlargements 49, which reside in horizontal slots through the blocks. The connecting links are plate-like and, in this instance, are arranged with their broad dimension extending in the direction of the axis of the spindle. Naturally, the connecting links are locked in the grooves by means, not shown, which are common in the art, such as cementing and the like.

Figure 8:
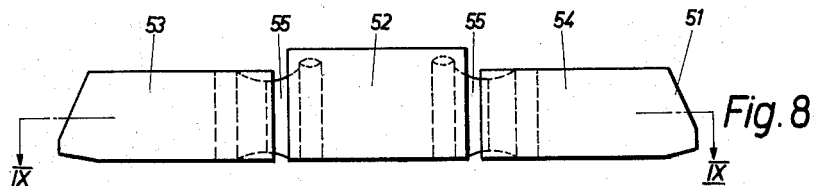
FIG. 8 is an elevational view of still another modification of the slipper block.
Figure 9:
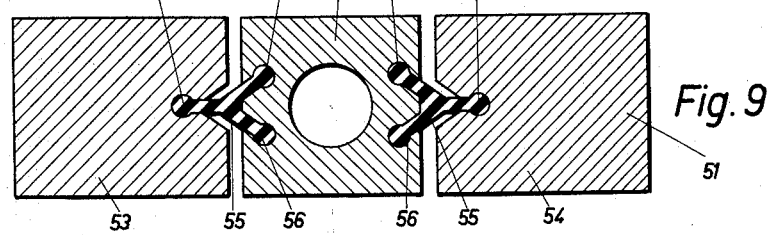
FIG. 9 is a horizontal sectional view of the slipper block taken on the line IX—IX of FIG. 8.

FIGS. 8 and 9 demonstrate a still further modification of the invention in which the slipper block, indicated generally by the reference numeral 51, is shown as being provided with separate central portion 52 and end portions 53 and 54. The end portions are connected to the central portion by elastomer connecting links 55. As is best evident in FIG. 9, each of these links is bifurcated or star-shaped in horizontal cross-section. Each link has three legs, the free end of each leg being provided with an enlargement 56 which is locked in a corresponding groove in the block to which it is attached. It is evident that, whereas one of the legs of each link is connected to an end portion, the other two legs are locked to the central portion.

Figure 10:
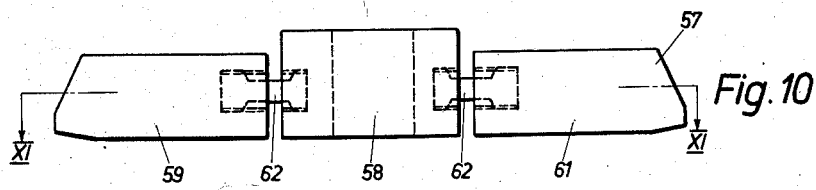
FIG. 10 is an elevational view of a still further modification of the invention.
Figure 11:
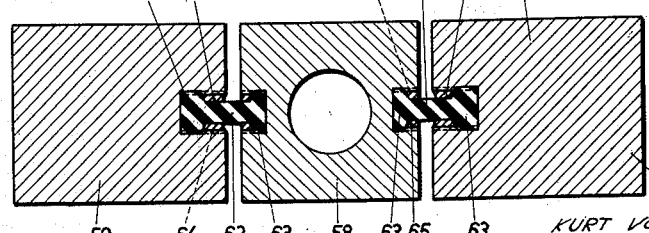
FIG. 11 is a horizontal sectional view of the slipper block taken on the line XI—XI of FIG. 10.

FIGS. 10 and 11 show a still further modification of the invention. The slipper block, indicated generally by the reference numeral 57, consists of a central portion 58 and end portions 59 and 61, the end portions 59 and 61 being connected to the central portion by elastomer connecting links 62 of generally cylindrical configuration. One end of each connecting link is provided with a cylindrical enlargement 63 which resides in a threaded bore 64 extending into the end portion 59. The end of the link is locked in the bore by a threaded bushing 65.

The operation of the apparatus will be readily understood in view of the above description. As the pinion gears 12 are rotated by a drive motor, the spindles 11 rotate and they, in turn, rotate the rolls 14 of the rolling mill 13 in their bearings. If the centerlines of the gears 12 and of the rolls 14 are exactly in line, there will be no problem of mis-alignment of the spindles. However, during the rolling mill operations the rolls 14 are separated by different distances at different portions of the rolling operation and there is considerable mis-alignment for which compensation must be made by means of the universal couplings 10. The rolls and the tongues 16 do not change their angular relationship, so that any angular change during driving must take place within the coupling 10. Angular displacement in what would be the vertical plane in FIG. 2 (at a right angle to the broad surface of the tongue or wobbler 16) results in the pin 21 adopting various angles relative to the axis of the spindle. The slipper blocks 19 and 21 move with the pin and, therefore, slide in a rotating manner within the slot 18. Angular changes of the spindle 11 in the horizontal plane (parallel to the broad surface of the tongue) causes the coupling to rotate relative to the tongue 16 about the pin 21, but this produces little, if any, direct change in the arrangements of the slippers 19 and 21 within the slot. However, during this rotation (which it will be understood takes place at a very rapid rate) there is a tendency for the slippers to rotate about the axis of the pin 21, and this would bring about (in a prior art solid slipper block) a considerable wear between the cylindrical surfaces of the slipper block and the cylindrical surface of the slot 18. In the present application, however, when rotation of this type takes place, it is accomplished almost entirely by the central portion 23. The central portion 23 rotates and takes part in these vibratory movements, but, because of the elastomer connecting links 26, the end portions 24 and 25 take part in this motion to a much more limited extent. Furthermore, the effect of the elastomer links is to reduce vibratory motions by absorption of the energy. That is to say, while there is a tendency for the central portion to vibrate about the axis of the pin 21, the end portions act as anchors, which tend to reduce these vibrations. The ultimate result of this restriction and the introduction of elastomer qualities into the slipper block is that wear is appreciably reduced. This action takes place in varying degrees, depending upon the shape and geometric relationship of the connecting links.

It is obvious that minor changes may be made in the form and construction of the invention without departing from the material spirit thereof. It is not, however, desired to confine the invention to the exact form herein shown and described, but it is desired to include all such as properly come within the scope claimed. The invention having been thus described, what is claimed as new and desired to secure by Letters Patent is:

1. A slipper block for a universal coupling, comprising
   (a) a central portion,
   (b) an end portion adapted to lie on one side of the central portion,
   (c) another end portion adapted to lie on the other side of the central portion, and
   (d) elastomer connecting links joining each of the end portions to the central portion, each connecting link consisting of a strip of elastomer material having an enlargement at each end which engages a corresponding groove in a portion of the block.

2. A slipper block as recited in claim 1, wherein each strip is arranged with its width perpendicular to the general plane of the block.

3. A slipper block as recited in claim 1, wherein each strip is arranged with its width parallel to the general plane of the block.

4. A slipper block for a universal coupling, comprising
   (a) a central portion,
   (b) an end portion adapted to lie on one side of the central portion,
   (c) another end portion adapted to lie on the other side of the central portion, and
   (d) elastomer connecting links joining each of the end portions to the central portion, each connecting link consisting of a piece of elastomer material having three legs, each leg having an enlargement at its free end to engage a corresponding groove in a portion of the block, at least one of the legs being joined to a portion of the slipper different from the point to which the other two are joined.

5. A slipper block for a universal coupling, comprising
   (a) a central portion,
   (b) an end portion adapted to lie on one side of the central portion,
   (c) another end portion adapted to lie on the other side of the center portion, and
   (d) elastomer connecting links joining each of the end portions to the central portion, each connecting link consisting of an elongated member each of whose ends lies in a bore in a portion of the slipper, each such end having an enlargement and being locked in the bore by a bushing.

6. A divided slipper block for articulated spindles, especially for rolling mill stands, wherein the parts are connected by elastic connecting links,
   characterized by the fact that the elastic connecting links are flat plates of elastic material and that the opposite ends are set in the divided parts of the block, the ends of the plates which are set in the slipper block parts being formed of dove-tail or cylinder form.

7. A divided slipper block as recited in claim 6 characterized by the fact that the grooves in the slipper block parts which carry the ends of the plates extend through the entire height of the slipper parts.

8. A divided slipper block according to claim 7 characterized by the fact that the grooves in both middle slipper block parts which extend in the direction of the outer slipper block parts exhibit a V-formed enlarged cross-section.

9. A spindle coupling, comprising
   (a) a driving member having a transverse slot with a generally cylindrical surface,
   (b) a driven member having a tongue adapted to lie within the slot,
   (c) a pin extending across the slot at a right angle to the axis and serving to join the driving and the driven members,
   (d) two slipper blocks, each lying on a side of the tongue and occupying the space between the tongue and the surface of the slot, each slipper block consisting of a central portion through which the pin extends and two end portions, and
   (e) elastomer connecting links constituting the sole connection between the end portions of each slipper block and the central portion, three or more flat arms forming a star-shaped unit, wherein the free ends are set separately or doubly in the slipper block part.

References Cited in the file of this patent

UNITED STATES PATENTS

| | | |
|---|---|---|
| 2,305,703 | Smith | Dec. 22, 1942 |
| 2,460,361 | Petho | Feb. 1, 1949 |
| 2,500,277 | Duffy | Mar. 14, 1950 |